United States Patent [19]

Ipponmatsu et al.

[11] Patent Number: 5,376,347
[45] Date of Patent: Dec. 27, 1994

[54] UNIFORM INORGANIC MICROPHERES AND PRODUCTION THEREOF

[75] Inventors: Masamichi Ipponmatsu, Hyogo; Masashi Nishigaki, Osaka; Akira Hirano; Tsuyoshi Tsurutani, both of Hyogo, all of Japan

[73] Assignees: Osaka Gas Company, Limited; Liquid Gas Co., Ltd.; Suzuki Yushi Industrial Co., Ltd., all of Osaka, Japan

[21] Appl. No.: 914,364

[22] Filed: Jul. 15, 1992

[30] Foreign Application Priority Data

Jul. 22, 1991 [JP] Japan .................. 3-180752

[51] Int. Cl.$^5$ ............................ C01B 33/141
[52] U.S. Cl. ................... 423/338; 423/339; 501/12; 252/315.7
[58] Field of Search ............ 501/12; 423/338, 339; 30/358; 83/30; 252/315.7

[56] References Cited

U.S. PATENT DOCUMENTS

| | | | |
|---|---|---|---|
| 3,397,257 | 8/1968 | Brambilla et al. | 501/12 |
| 4,640,807 | 2/1987 | Afghan et al. | 423/338 |
| 4,911,903 | 3/1990 | Unger et al. | 423/338 |
| 4,927,560 | 5/1990 | Osaka et al. | 252/315.7 |
| 4,994,335 | 2/1991 | Kamei et al. | 429/254 |

FOREIGN PATENT DOCUMENTS

| | | |
|---|---|---|
| 0278059 | 8/1988 | European Pat. Off. |
| 481892 | 4/1992 | European Pat. Off. |
| 54-6251 | 3/1979 | Japan |
| 57-55454 | 11/1982 | Japan |
| 4-154605 | 5/1992 | Japan |

OTHER PUBLICATIONS

"Ultrastructure Processing of Ceramics, Glasses, and Composites", by E. Barringer et al, John Wiley & Sons, New York, 1984, no month, pp. xiii–xvi and 315–333.

*Primary Examiner*—Mark L. Bell
*Assistant Examiner*—C. M. Bonnar
*Attorney, Agent, or Firm*—Jordan and Hamburg

[57] ABSTRACT

A method of producing uniform inorganic microspheres with a particle size of 0.01 to 500 μm by injecting an aqueous solution containing a particle-forming material into an organic solvent. The method includes injecting the aqueous solution into the organic solvent through a macromolecular membrane having a hydrophobic surface and having pores substantially uniform in pore size and extending in the direction of thickness of the membrane, substantially straight through the membrane, so that a path length of each of the pores corresponds substantially to a thickness of the membrane, to form, in said organic solvent, a large number of emulsion particles substantially uniform in size and then producing uniform inorganic microspheres from said emulsion particles on a one emulsion particle-to-one microsphere basis. The pores in the membrane are formed by either a corpuscular or laser beam.

11 Claims, 2 Drawing Sheets

UNIFORM INORGANIC MICROPHERES AND PRODUCTION THEREOF

BACKGROUND OF THE INVENTION

The present invention relates to uniform inorganic microspheres and to a method of producing the same.

A method of producing inorganic microspheres is disclosed in Japanese Patent Publication No. 54-6251 and No. 57-55454.

Said method comprises mixing an aqueous solution of an inorganic compound with an organic solvent to give a w/o type emulsion and causing precipitation of emulsion particles formed in said emulsion to thereby obtain inorganic microspheres.

However, it is difficult to produce inorganic microspheres substantially uniform in particle size by the above method. The inorganic microspheres obtained by the above method are not uniform in particle size.

Therefore, to overcome the above disadvantage, a method of producing inorganic microspheres which comprises using the membrane-emulsified reversed micelle technique has been proposed (Japanese Kokai Patent Publication No. 04-154605 (Japanese Patent Application No. 02-277507)).

This method comprises injecting under pressure an aqueous solution of an inorganic compound into an organic solvent through a microporous membrane having a hydrophobic surface. The microspheres obtained by this method have a somewhat narrower particle size distribution.

Nevertheless, the above production method using the membrane-emulsified reversed micelle technique has the following disadvantages.

1) The pores in the microporous membrane are winding and twisty within the membrane and, therefore, the particle source material-containing aqueous solution travels several centimeters through the pores from its entering the microporous membrane to its leaving the same. This causes a great pressure loss in the microporous membrane. In particular when inorganic microspheres having a small particle size or when an aqueous starting material solution having a high viscosity is used, the production per unit time becomes very low.

2) The standard deviation, on the volume basis, for the particle size distribution of the particles obtained is much narrower as compared with the method not relying on the membrane-emulsified reverse micelle technique but still corresponds to 20–50% of the mean particle size. Such variability, which is due to the variability in the micropore size in the microporous membrane and the variability in the shape of the pore opening edge on the membrane surface, is still great and unsatisfactory.

3) The alkali contained in the aqueous source material solution damages the microporous membrane, for example causes peeling of the hydrophobic layer provided on said microporous membrane, hence the service life of said membrane is as short as several hours to scores of hours.

Another known method of producing inorganic microspheres is the so-called sol-gel method, as described in E. Barringer et al.: Ultrastructure Processing of Ceramics, Glasses, and Composites, John Wiley & Sons, New York (1984), pages 315-333.

The method comprises injecting a sol containing a particle source material before polymerization into an organic solvent to form sol emulsion particles and then promoting the polymerization reaction to thereby cause gelation and precipitation of the sol emulsion particles.

In this method, too, the variability in the particle size of the inorganic microspheres obtained is great and this offers a problem.

SUMMARY OF THE INVENTION

It is an object of the present invention to solve the above problems and provide microspheres having a narrow particle size distribution and a method of producing said microspheres in a simple and easy manner continuously for a long period of time.

In an aspect thereof, the invention provides a method of producing uniform inorganic microspheres with a particle size of 0.01 to 500 $\mu$m by injecting an aqueous solution containing a particle-forming material into an organic solvent.

The method includes injecting the aqueous solution into the organic solvent through a macromolecular membrane which has through pores substantially uniform in pore size and extending in the direction of thickness, and substantially straight through the membrane, and has a hydrophobic surface. As a result, there is forward, in the organic solvent, a large number of emulsion particles substantially uniform in size. Finally, the method includes producing uniform inorganic microspheres from the emulsion particles on a one emulsion particle-to-one microsphere basis.

In accordance with another aspect of the invention, uniform inorganic microspheres are provided which are uniform in pore size and produced by injecting a silica sol containing a water-soluble organic macromolecular compound into an organic solvent through a macromolecular membrane which has through pores substantially uniform in pore size and extending in the direction of thickness and has a hydrophobic surface. As a result of the injection, there is formed, in the organic solvent, emulsion particles of the sol, promoting the polymerization reaction for gelation of the emulsion particles to give fine silica gel particles. Finally, the silica gel particles are subjected to washing with water, drying and calcination.

In a third aspect, the invention provides a method of producing uniform inorganic microspheres uniform in pore size which comprises injecting a silica sol containing a water-soluble organic macromolecular compound into an organic solvent through a macromolecular membrane which has through pores substantially uniform in pore size and extending in the direction of thickness and has a hydrophobic surface. As a result, there is formed an emulsion of particles of the sol in said organic solvent. Then the polymerization reaction for gelating the emulsion particles is promoted to form fine silica gel particles, which are precursors to microspheres. Finally, the fine silica gel particles are subjected to washing with water, drying and calcination.

In a fourth aspect, the invention provides uniform inorganic microspheres which are produced from emulsion particles in an organic solvent. An aqueous solution containing a microsphere-forming material is injected into the organic solvent through a hydrophobic membrane made of a synthetic resin such as a polyimide, polyethylene terephthalate or a fluororesin and provided with through pores substantially uniform in pore size and extending in the direction of thickness by irradiation with laser beams not more than 355 nm in wavelength.

DETAILED DESCRIPTION OF THE PREFERRED EMBODIMENTS

Figure 1:
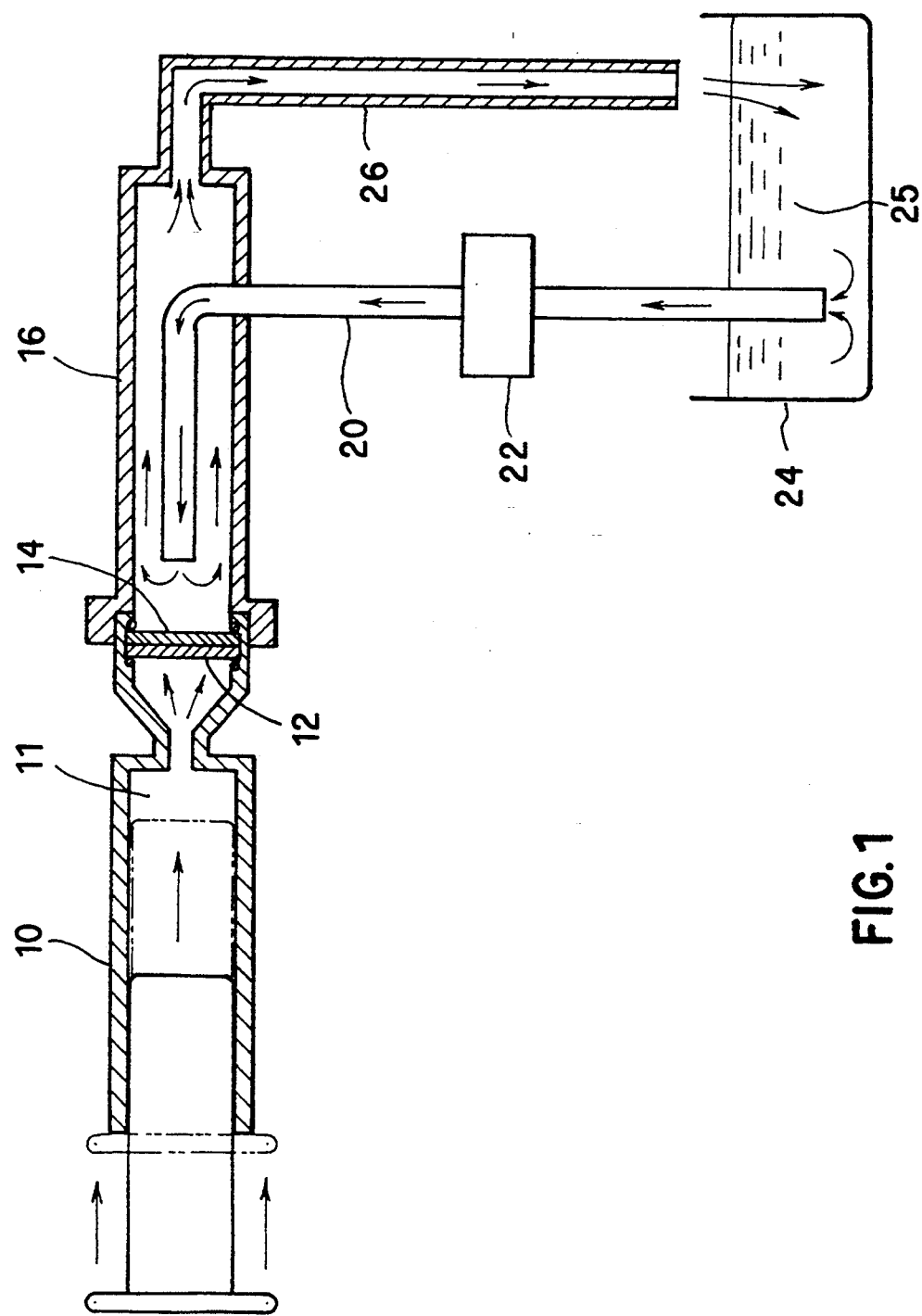
FIG. 1 schematically illustrates a production apparatus to be used in an embodiment of the invention.

The pressure loss within the membrane can be much reduced by injecting the aqueous solution which contains a particle-forming material into the organic solvent through a macromolecular membrane that has through pores substantially uniform in pore size and extending in the direction of thickness. Suppose that a membrane having a pore opening diameter of 0.5 $\mu$m and a thickness of 15 $\mu$m is used, then the path length along the pore would be substantially the same as the membrane thickness, i.e. 15 $\mu$m is the case of the macromolecular membrane to be used in accordance with the invention while the path length along the pore would be about 1 cm in the case of conventional microporous membranes. Thus, if the pore density is identical, the pressure loss would be as small as about one six hundredth. Such decrease in pressure loss can lead to an increase in the productivity of uniform inorganic microspheres.

The thickness of the macromolecular membrane to be used is not critical but is preferably 5 to 2,000 times the pore size, and more preferably 30 to 500 times the pore size. When the thickness of the macromolecular membrane is less than 5 times the pore size, a sufficient laminar flow will not be formed within the pore but the outlet flow is influenced by the inlet flow. Conversely, when said thickness is more than 2,000 times the pore size, the pressure loss will be too great.

By mixing the organic solvent containing a large number of emulsion particles formed therein with an aqueous solution containing a precipitant capable of precipitating the emulsion particles, following by drying and calcining the resulting water-insoluble precipitate, it is possible to produce uniform inorganic microspheres from the emulsion particles on a one emulsion particle-to-one microsphere basis in a very easy manner and at a low cost.

The aqueous solution containing the particle-forming material is not particularly limited in kind but should preferably be an aqueous solution of a basic salt. The use of a basic salt-containing aqueous solution is advantageous in that the precipitation reaction can proceed smoothly.

The kind of basic salt is not critical, but is preferably an alkali metal silicate, which is highly soluble.

For converting the emulsion particles formed in the organic solvent in large numbers to microspheres, two methods are available. As mentioned above, one comprises adding a precipitant to the organic solvent containing emulsion particles to thereby cause formation of a particle precursor precipitate and calcining or drying this precipitate at a high temperature to obtain microspheres. Another method comprises converting a sol containing a prepolymerization particle-forming material to sol emulsion particles in the organic solvent, then promoting the polymerization reaction to thereby cause gelation and precipitation of the sol emulsion particles and drying and calcining the resulting precipitate.

As compared with the former method, the latter method is advantageous in that the uniform inorganic microspheres obtained have a very low impurity level. Thus, in the water glass-$NH_4CO_3$ system, for instance, not less than 0.3% of Na remains in microspheres in the conventional methods while the above-mentioned sol-gel method can produce $SiO_2$ microspheres having a purity of 99.9%. Another advantage is that the micropore size distribution becomes narrower (i.e. the micropore size becomes uniform). Therefore, the thus-obtained microspheres are suited for use as packings for liquid chromatography, for instance.

When a silica sol is used as the particle-forming material sol, the microspheres obtained are $SiO_2$ having good heat resistance and can suitably be used, for example, as tracer particles for measuring the rate of flow of a high-temperature fluid.

As the means for promoting the polymerization reaction mentioned above, there may be mentioned heating, addition of a polymerization accelerator, and irradiation of light.

When uniform inorganic microspheres are produced using a silica sol supplemented with a water-soluble organic macromolecular compound, the micropore size distribution in the uniform inorganic microspheres can be made more narrow (uniformity of the micropore size) and the thus-obtained microspheres are porous and spherical $SiO_2$ particles substantially uniform in micropore size.

When a macromolecular membrane having through pores formed by irradiation with a corpuscular beam is used, the microspheres obtained have a much sharper particle size distribution as compared with the products obtained by using conventional microporous membranes, since the through pores in said macromolecular membrane show a narrow pore size distribution (at least 99% falling within the range of ±10%).

When laser beam irradiation is employed for forming through pores, the through pores show a still narrower pore size distribution (at least 99% falling within the range of ±1%), although the cost may be increased as compared with the use of a corpuscular beam. Thus, the microspheres obtained naturally show a still narrower particle size distribution.

When a laser beam is used, the film thickness should desirably be not more than 10 times the pore size. It is desirable that the perforation be carried out using an excimer laser and producing, on said macromolecular membrane, an image of a pattern on a mask by means of a stepper (scale-down exposure apparatus for semiconductors), although any other appropriate method may also be used.

Particularly when a laser beam of a short wavelength not longer than 355 nm is used, the shape of the pore opening edge of the macromolecular membrane surface will not become vague or irregular, so that the above-mentioned effects can be produced to a greater extent (a short wavelength laser beam does not perforate the membrane thermally but perforates the same by cleaving chemical bonds and, therefore, the pore opening edge on the macromolecular membrane surface can have its proper shape).

Uniform inorganic microspheres, when produced by using a macromolecular membrane provided with through pores by irradiation with a laser beam of a wavelength not longer than 355 nm, show a very narrow particle size distribution, with a volume-based standard deviation of not more than 10% of the mean particle size.

The particle-forming material-containing aqueous solution to be used in the practice of the invention is an aqueous solution containing at least one inorganic compound selected from the class consisting of alkali metal silicates, carbonates, phosphates and sulfates, alkaline earth metal halides, and sulfates, chlorides and nitrates of copper group and iron group elements and having a concentration of from 0.3 mol/liter up to saturation.

When the macromolecular membrane to be used is itself hydrophobic, any treatment to render it hydrophobic is not needed. Thus, a membrane made of such a synthetic resin as a polyimide, polyethylene terephthalate or a fluororesin (e.g. TEFLON, registered trademark of du Pont), which is already hydrophobic, need not be treated for rendering it hydrophobic. Such a membrane is resistant to alkalis, so that is is not necessary to be concerned about chemical degradation. If, however, the membrane is lacking in hydrophobicity, it should be treated for rendering the surface thereof hydrophobic.

The means for rendering the membrane surface hydrophobic is not limited to any particular one but may include the application of silicone materials such as thermosetting silicone oils (e.g. dimethylpolysiloxane, methylhydrogenpolysiloxane), silicone emulsions and silicone resins, silane coupling agents such as methyltrimethoxysilane, hexamethyldisilane, vinyltrimethoxysilane and trimethylchlorosilane, cyclic silicon compounds such as dihydrogenhexamethylcyclotetrasiloxane and trihydrogenpentamethylcyclotetrasiloxane, titanate coupling agents such as isopropyl tristearoyl titanate and isopropyl tri(N-aminoethyl) titanate, aluminum-based coupling agents such as acetoalkoxyaluminum diisopropylate, fluorosilicone coating compositions, fluorine-containing coating compositions, and the like, inclusive of plasma polymerization of siloxanes.

The organic solvent to be used in the practice of the invention is not limited to any particular species. However, an organic solvent having a solubility in water of not more than 5% should preferably be used. Specific examples of such organic solvent are listed below.

Aliphatic hydrocarbons, such as n-hexane, isohexane, n-heptane, isoheptane, n-octene, isooctene, gasoline, petroleum ether, kerosene, benzine, mineral spirit, etc.

Alicyclic hydrocarbons, such as cyclopentane, cyclohexane, cyclohexene, cyclononane, etc.

Aromatic hydrocarbons, such as benzene, toluene, xylene, ethylbenzene, propylbenzene, cumene, mesitylene, tetralin, styrene, etc.

Ethers, such as propyl ether, isopropyl ether, etc.

Halogenated hydrocarbons, such as methylene chloride, chloroform, ethylene chloride, trichloroethane, trichloroethylene, etc.

Esters, such as ethyl acetate, n-propyl acetate, isopropyl acetate, n-butyl acetate, isobutyl acetate, n-amyl acetate, isoamyl acetate, butyl lactate, methyl propionate, ethyl propionate, butyl propionate, methyl butyrate, ethyl butyrate, butyl butyrate, etc.

The organic solvents mentioned above may be used either singly or in combination as a mixture of two or more of them.

A surfactant may be incorporated in the above organic solvent. Said surfactant is not limited to any particular species provided that it should be nonionic. Preferred examples are listed below.

Polyoxyethylenesorbitan aliphatic esters, such as polyoxyethylenesorbitan monolaurate, polyoxyethylenesorbitan monopalmitate, polyoxyethylenesorbitan monostearate, polyoxyethylenesorbitan tristearate, polyoxyethylenesorbitan monooleate, polyoxyethylenesorbitan trioleate, polyoxyethylenesorbitan stearate, etc.

Polyoxyethylene higher alcohol ethers, such as polyoxyethylene lauryl ether, polyoxyethylene cetyl ether, polyoxyethylene stearyl ether, polyoxyethylene oleyl ether, polyoxyethylene octylphenol ether, polyoxyethylene nonylphenol ether, etc.

Polyoxyethylene aliphatic esters, such as polyoxyethylene glycol monolaurate, polyxyethylene glycol monostearate, polyoxyethylene glycol stearate, polyoxyethylene glycol monooleate, etc.

Glycerol aliphatic esters, such as stearic acid monoglyceride, oleic acid monoglyceride, etc.

Polyoxyethylenesorbitol aliphatic esters, such as polyoxyethylenesorbitol tetraoleate, etc.

The surfactants mentioned above may be used either singly or in combination as a mixture of two or more of them. The surfactant addition level is preferably not more than about 10% by weight, more preferably about 0.1 to 3% by weight, on the organic solvent basis.

The precipitant-containing aqueous solution capable of causing precipitation of emulsion particles includes, but is not limited to, aqueous solution containing at least one member of the class consisting of alkaline earth metal halides, inorganic acids, organic acids, inorganic acid ammonium salts, organic acid ammonium salts and alkali metal carbonates. Specific examples are aqueous solution of ammonium bicarbonate, ammonium sulfate, potassium chloride or potassium hydrogen carbonate.

The aqueous solution mentioned above should preferably have a concentration of 0.05 mol/liter to saturation concentration, more preferably 0.1 to 2.0 mol/liter.

The water-soluble macromolecular organic compound is not limited to any specific species but may include polyethylene glycol, sodium polystyrenesulfonate, polyacrylic acid, polyacrylamide, polyethylenimine, polyethylene oxide, polyvinylpyrrolidone, etc.

The corpuscular beam for producing the macromolecular membrane to be used in accordance with the invention may be a neutron beam, electron beam or alpha particle beam, for instance.

Macromolecular membranes made of a polycarbonate or polyester, which have through pores produced by corpuscular beam irradiation followed by etching with an aqueous alkali solution are available from General Electric Co. (trademark: Nuropore Filter; distributed in Japan by Nomura Micro Science) and they can be used as the macromolecular membrane in the practice of the invention. Among them, polyester membranes, which are superior in chemical resistance, are preferred.

The uniform inorganic microspheres produced by the method of the present invention can be used as packings for liquid chromatography, as already mentioned hereinbefore, and further can be used as packings for gas chromatography, spacers for liquid crystal display devices, seeding particles for laser Doppler flow meters and other visualizing tracer particles, among others.

Furthermore, they can be used widely in various fields such as inorganic microcapsule wall materials for attaining sustained release of perfumes, dyes, biocides, insecticides, insect and beast repellents, vitamins, food, nutrients, drugs, deodorants, adhesives, liquid crystals and the like, that are encapsulated therein.

It is also possible to produce colored microspheres by encapsulating a colored substance, such as a pigment or dye, therein. Such colored microspheres can be used as additives for cosmetics, inks an plastics. They are further expected to show excellent performance characteristics as magnetic tape constituents and as catalysts.

The production method of the present invention makes it possible to produce uniform inorganic microspheres with markedly increased productivity.

The uniform inorganic microspheres produced by the method of the invention show a marked improvement in the uniformity in particle size and thus show a very narrow particle size distribution.

When they are produced using a hydrophobic membrane made of a polyimide or the like, the membrane, even when the aqueous solution contains an alkali, for instance, is fairly free from being damaged, unlike in the prior art methods, and can be used for a prolonged period of time. In such case, any starting material-containing aqueous solution may be used without particular limitation.

The pore size of the thus-producible uniform inorganic microspheres can be controlled by adding a water-soluble organic macromolecular compound to the aqueous solution containing the microsphere-forming material.

The following working examples and comparative examples illustrate the invention in further detail, but are by no means limitative of the scope of the invention.

EXAMPLE 1

A thin membrane (trademark: NUROPORE FILTER manufactured by General Electric Co.) having a large number of through pores substantially uniform in pore size and extending in the direction of thickness as provided by corpuscular beam irradiation followed by etching the resultant defects with an aqueous alkali solution was dried at 100° C. for 24 hours and then subjected to silane coupling treatment by immersing in a 10% (by weight) solution of triethylchlorosilane in toluene at room temperature to thereby render the surface of said thin membrane hydrophobic. The thus-treated thin membrane had a pore size of 0.20 $\mu$m and a thickness of 15 $\mu$m.

An emulsification apparatus, as shown in FIG. 1, was equipped with the above thin membrane as a macromolecular membrane, and a 4% aqueous solution of sodium silicate was introduced, under pressure, into 800 ml of a 20 g/liter solution of polyoxyethylene (20) sorbitan trioleate in hexane through a syringe pump at a feeding rate of 1 g/cm$^2$/min. and at a temperature of 25° C. A large number of emulsion particles were formed in the hexane solution.

Brief mention is now made of the apparatus shown in FIG. 1. The reference 10 indicates a syringe-type metering pump portion. A macromolecular membrane 12 is mounted on the head portion of said syringe-type metering pump portion 10. The reference number 14 indicates a supporting net for supporting said macromolecular membrane 12. The reference number 16 indicates a tubular reaction vessel and is connected with the syringe-type metering pump 10. The reference number 20 indicates a feed pipe and can feed an organic solvent 25 from an organic solvent beaker 24 into said reaction vessel 16 through a metering pump 22. An aqueous solution 11 containing a particle-forming material can be poured quantitatively into the organic solvent 25 in the reaction vessel 16 through the syringe-type metering pump portion 10 mentioned above. A large number of emulsion particles are formed in said organic solvent and the organic solvent containing said emulsion particles is returned from the reaction vessel 16 to the organic solvent beaker 24 through an outlet pipe 26.

A solution containing a large number of emulsion particles as produced in the above manner was added to 1 liter of a 1.5 mol/liter solution of ammonium bicarbonate, whereupon a water-insoluble precipitate gradually formed. After 2 hours of standing, the resulting mixture is filtered, and the solid phase was washed with water and then with methanol and dried at 110° C. for 24 hours to give silica microspheres.

The silica microspheres obtained had an average particle size of 1.2 $\mu$m, with a volume-based standard deviation of 0.2 $\mu$m.

The membrane could be used for at least 30 hours.

COMPARATIVE EXAMPLE 1

Figure 2:
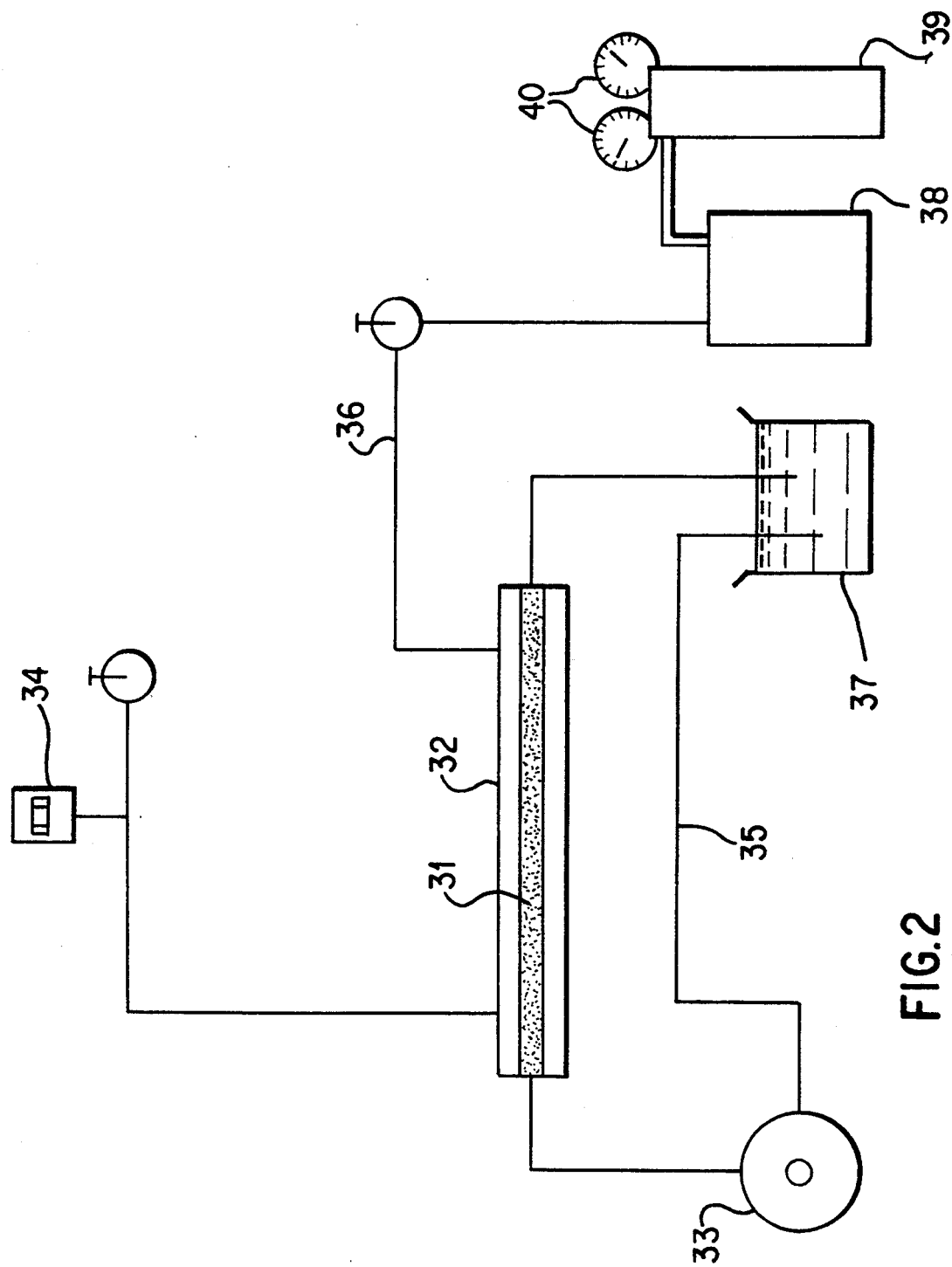
FIG. 2 schematically illustrates a production apparatus used in a comparative example.

Silica microspheres were produced under the same conditions as employed in Example 1 except that an emulsifying apparatus as shown in FIG. 2 was equipped with a cylindrical microporous membrane made CaO-B$_2$O$_3$-SiO$_2$-Na$_2$O-MgO glass and having an average pore size of 1.05 $\mu$m.

In FIG. 2, the reference numbers respectively indicate the following: 31-cylindrical glass-made microporous membrane, 32-module, 33-pump, 34-manometer, 35-oil phase tank, 36-aqueous phase line, 37-oil phase tank, 38-aqueous phase tank, 39-tank for pressurization, and 40-pressure gage.

The silica microspheres obtained had an average particle size of 3.8 $\mu$m, with a volume-based standard deviation of 0.8 $\mu$m.

The microspheres contained about 0.5% of Na and showed a considerably broad pore size distribution with a center at about 200 angstroms.

COMPARATIVE EXAMPLE 2

Silica microspheres were produced under the same conditions as employed in Comparative Example 1 except that a cylindrical glass-made microporous membrane with an average pore size of 0.4 $\mu$m was used.

The silica microspheres obtained had an average particle size of 1.2 $\mu$m, with a volume-based standard deviation of 0.4 $\mu$m.

In this example, the rate of emulsification per unit area was about one twentieth of that in Example 1, and the pressure loss was about 100-fold greater.

EXAMPLE 2

A polyimide film having a thickness of 10 $\mu$m was irradiated with a KrF excimer laser beam (wavelength 251 nm) for providing the film with pores 1.10 $\mu$m in diameter. The emulsifying apparatus shown in FIG. 1 was equipped with the thus-perforated film, and microspheres were produced using said apparatus.

The organic solvent used was a solution (20 g/liter) of polyoxyethylene(20)sorbitan trioleate in hexane.

The aqueous solution used was a solution prepared by adding 1.0 mole of tetraethoxysilane, 2.2 moles of methanol, 1.0 mole of dimethylformamide and $4 \times 10^{-4}$ moles of ammonia to 10 moles of water.

After emulsification at 5° C., the resultant emulsion was refluxed for 30 hours, whereby emulsion particles formed in the organic solvent gelated and precipitated. The precipitate was dried and then calcined at 800° C. to give silica microspheres uniform in particle size.

The silica microspheres obtained had an average particle size of 3.10 $\mu$m, with a volume-based standard deviation of 0.10 μm. The pore size distribution was narrow, covering the range of 60 to 300 angstroms.

The macromolecular membrane mentioned above could be used for a total of at least 300 hours.

EXAMPLE 3

Silica microspheres were produced under the same conditions as used in Example 2 except that 0.1 mole of polyethylene glycol, a water-soluble organic macromolecule, was added to the aqueous solution used.

The silica microspheres obtained had an average particle size of 3.02 μm, with a standard deviation of 0.10 μm. The pore size distribution of the pores formed was very narrow, with a center at 450 angstroms.

The pore size could be controlled by varying the concentration of polyethylene glycol.

What is claimed is:

1. A method of producing uniform inorganic microspheres with a particle size of 0.01 to 500 μm by injecting an aqueous solution containing a particle-forming material into an organic solvent, said method comprising injecting said aqueous solution into said organic solvent through a macromolecular membrane having a hydrophobic surface and having pores substantially uniform in pore size and extending in the direction of thickness of the membrane, substantially straight through the membrane, so that a path length of each of the pores corresponds substantially to a thickness of the membrane, to form, in said organtic solvent, a large number of emulsion particles substantially uniform in size; and producing uniform inorganic microspheres from said emulsion particles on a one emulsion particle-to-one microsphere basis.

2. A method of producing uniform inorganic microspheres as claimed in claim 1, wherein said macromolecular membrane has a thickness 5 to 2,000 times the pore size.

3. A method of producing uniform inorganic microspheres as claimed in claim 1, wherein the emulsion particle-containing organic solvent is mixed with an aqueous solution containing a precipitant capable of causing precipitation of the emulsion particles and the resulting water-insoluble precipitate is dried and calcined.

4. A method of producing uniform inorganic microspheres as claimed in claim 1, wherein the aqueous solution to give emulsion particles is an aqueous solution of a basic salt.

5. A method of producing uniform inorganic microspheres as claimed in claim 4, wherein said basic salt is an alkali metal silicate.

6. A method of producing uniform inorganic microspheres as claimed in claim 1, wherein the aqueous solution to give emulsion particles is a sol of the particle-forming material and wherein said sol is injected into the organic solvent and the resulting sol emulsion particles are caused to gelate by promoting the polymerization reaction and the thereby formed particle precursor precipitate is dried and calcined.

7. A method of producing uniform inorganic microspheres as claimed in claim 6, wherein the particle-forming material sol is a silica sol prepared by hydrolysis of an organic silicon compound.

8. A method of producing inorganic microspheres uniform in pore size which comprises injecting a silica sol containing a water-soluble organic macromolecular compound into an organic solvent through a macromolecular membrane having a hydrophobic surface and having pores substantially uniform in pore size and extending in the direction of thickness of the membrane, substantially straight through the membrane, so that a path length of each of the pores corresponds substantially to a thickness of the membrane, to form sol emulsion particles in said organic solvent, promoting a polymerization reaction to convert said sol emulsion particles to silica gel particles, which are microsphere precursors, and subjecting said silica gel particles to washing with water, drying and calcination.

9. A method of producing uniform inorganic microspheres as claimed in any of claims 1 or 8, wherein said macromolecular membrane is a membrane made of a synthetic resin including a polycarbonate or polyester, the pores in the membrane are formed by irradiation with a corpuscular beam followed by etching of the resulting defects with an aqueous alkali solution.

10. A method of producing uniform inorganic microspheres as claimed in any of claims 1 or 8, wherein the macromolecular membrane is made of a synthetic resin including a polyimide, polyethylene terephthalate or a fluororesin, the pores in the membrane are formed by laser beam irradiation.

11. A method of producing uniform inorganic microspheres as claimed in claim 10, wherein the laser beam has a wavelength not longer than 355 nm.

* * * * *